W. F. FOLMER.
HOLDER FOR PHOTOGRAPHIC SENSITIZED MATERIAL.
APPLICATION FILED MAY 1, 1914.
1,146,858.
Patented July 20, 1915.
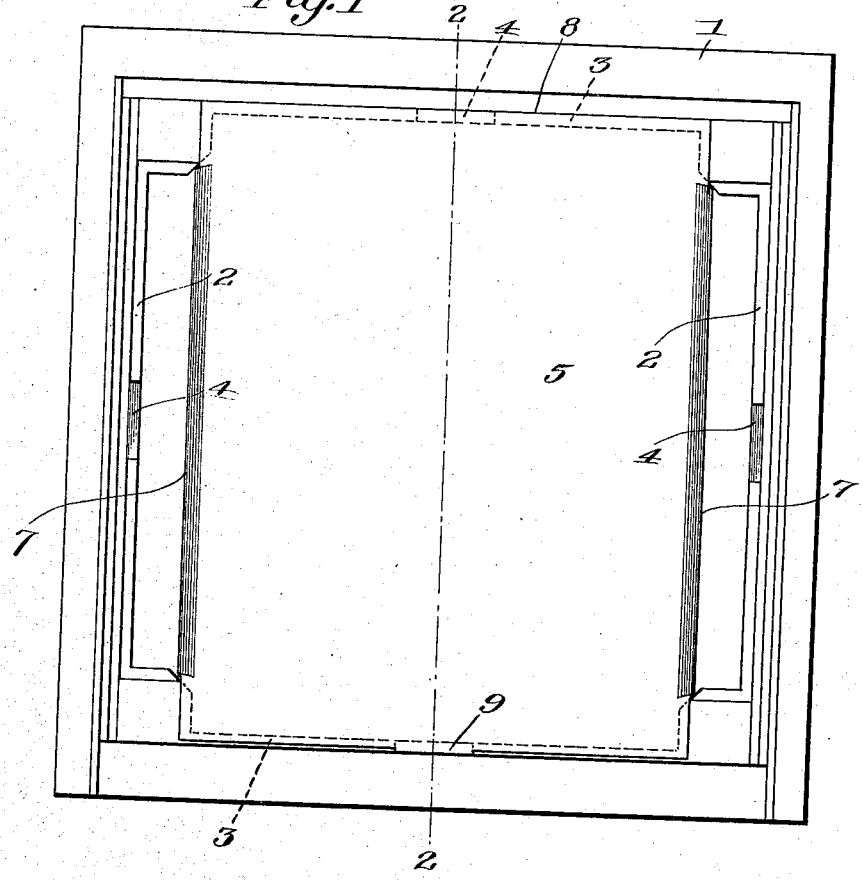
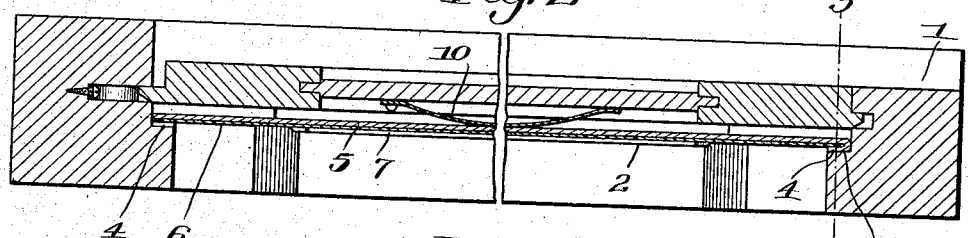
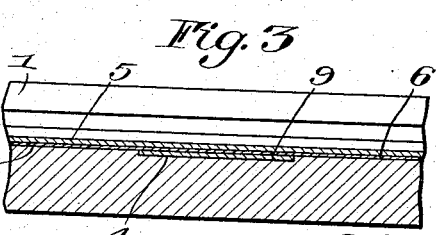
Witnesses
Nelson H. Copp
Russell B. Griffith
Inventor
William F. Folmer
By Church & Rich
his Attorneys

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

HOLDER FOR PHOTOGRAPHIC SENSITIZED MATERIAL.

1,146,858.  Specification of Letters Patent.  Patented July 20, 1915.

Application filed May 1, 1914. Serial No. 835,621.

*To all whom it may concern:*

Be it known that I, WILLIAM F. FOLMER, of Rochester, in the county of Monroe and State of New York, have invented certain new and useful Improvements in Holders for Photographic Sensitized Material; and I do hereby declare the following to be a full, clear, and exact description of the same, reference being had to the accompanying drawings, forming a part of this specification, and to the reference-numerals marked thereon.

My present invention relates to photography and more particularly to photographic cameras and plate holders therefor, and it has for its object to provide a device of the latter nature wherein flexible plates or "cut films", as they are called, may be accurately positioned in the exact focal plane of the camera.

A further object of the invention is to attain the beforementioned end when the films are carried in a sheath or septum permitting them to be handled with greater convenience and tending to hold them in a flat condition, the arrangements being such that the film remains within the sheath when so positioned in the focal plane and exposed.

To these and other ends the invention consists in certain improvements and combinations of parts all as will be hereinafter more fully described, the novel features being pointed out in the claim at the end of the specification.

In the drawings: Figure 1 is a rear elevation of a plate holder constructed in accordance with and illustrating one embodiment of my invention; Fig. 2 is a central section thereof, taken substantially on the line 2—2 of Fig. 1, an intermediate portion of the holder being broken away, and Fig. 3 is a detail fragmentary section taken on the line 3—3 of Fig. 2.

Similar reference numerals in the several figures indicate the same parts.

The present invention comprises a plate holder frame, "adapter", or camera back either fixed to or removable from the camera body or any of the known devices for supporting a sensitized medium in a definitely placed seat at the rear of the camera and it contemplates the use, in combination therewith, of a film sheath or septum of the nature disclosed in the pending application of Herman C. Sievers, entitled "Method of and device for holding photographic film sheets", filed February 18, 1914, Serial No. 819,333, or of any film holding sheath fulfilling the requirements hereinafter specified, the object being, as previously indicated, to position the film directly in the seat while still reinforced by the rigid carrying sheath.

Referring more particularly to the drawings in this view, 1 indicates such a plate holding frame that may have multiple seats to accommodate plates or films of different sizes but which, in the present instance, has two inner rabbets or grooves 2 and 3, in the opposite sides or rails forming two seats in the same plane for the reception of a plate or of a film holder of a given size and oblong shape in either of two positions at right angles to each other so that the greater dimension may be disposed either horizontally or vertically as will best receive the image desired, all according to a well known practice. In the front face or bottom of each seat, (and preferably also at each side of the frame) I form a recess or cutaway portion 4.

The film carrying sheath or septum is indicated at 5 and may comprise a flat metal plate forming a rigid backing against which a flexible sheet of cut film 6, preferably equal in size to the backing plate, is disposed. On the longer sides, which do not come in contact with the seat, long overhanging flanges 7 offset from the front of the plate are turned over to engage the corresponding margins of the film sheet when the latter is slid into place, and to retain it against the backing. One of the ends of the sheath, in the present instance the end indicated at 8, is left clear for the edgewise entrance of the film, but at the other end a short flange 9 similar to the flanges 7 is provided, preferably at a central point, to act as a stop for the advance edge of the film and also to assist in holding the end margin thereof against the backing. As stated, this flange 9 runs along only a fraction of the length of the backing edge and the flanges 7 also terminate short of the extremities of the two intersecting edges while the edge 8 has no flange at all. Therefore, when the sheath 5 is placed in one of the seats 3, 4, the flanges 7 occupy the clear space within the center of the frame out of contact while the short flange 9 on the shorter edge occupies one of the recesses 4 in the bottom or front face of the seat, such a recess being provided in each rabbet as shown so that the sheath may occupy either of two relatively reversed positions in each seat and it is not required to insert it in any particular way. The result is that the film sheet 6 rests directly against the bottom or front face of the seat in each instance, and its margins are thereby held flat in the exact focal plane defined by such face which tends to dispose the body of the sheet in the same plane. It will be seen, therefore, that the sheath 5 contacts with the seat in a forward direction only through the medium of the film itself instead of directly as formerly, and the usual compressor spring 10 bearing against the rear of the sheath for this reason clamps the film itself instead of merely holding the sheath securely with such devices as confine the film in its sheath being relied upon to maintain the security and flat condition of the latter.

From the foregoing it will be seen that the essence of the invention, in its broadest aspect, and irrespective of the particular flange formation shown, consists in cutting away the sheath and seat in such a complementary manner as will allow the film alone to engage the latter while still being positively retained in and supported by the sheath.

I claim as my invention:

In a photographic plate holder, the combination with a frame having a seat extending along four sides, the front face or bottom of which latter defines the focal plane of the camera and is provided with recesses at the top and bottom and both sides, of a film sheath embodying a rigid backing and overhanging retaining members on three sides thereof offset from the front face to engage a sheet of film carried by the sheath on three sides and hold it against the backing, the intermediate one of said three retaining members being relatively short and centrally arranged to occupy selectively any one of the recesses in the seat whereby such film sheet is allowed to directly contact with the bottom of the seat to the exclusion of the sheath when the latter is inserted in any one of the four positions in the plate holder.

WILLIAM F. FOLMER.

Witnesses:
 MARGARET H. MILLIGAN,
 GEORGE T. ROCHE.

Copies of this patent may be obtained for five cents each, by addressing the "Commissioner of Patents, Washington, D. C."